April 17, 1951     H. L. CONDIFF     2,549,574
APPARATUS FOR MAKING FLUOROPHOTOMETRIC
MEASUREMENTS
Filed July 8, 1948

INVENTOR.
HOWARD L. CONDIFF
BY Paul, Paul & Moore
ATTORNEYS

Patented Apr. 17, 1951

2,549,574

UNITED STATES PATENT OFFICE 2,549,574

APPARATUS FOR MAKING FLUOROPHOTOMETRIC MEASUREMENTS

Howard Lee Condiff, St. Paul, Minn., assignor to Archer-Daniels-Midland Company, Minneapolis, Minn., a corporation of Delaware Application July 8, 1948, Serial No. 37,566

4 Claims. (Cl. 88—14)

This invention relates to an improved apparatus for making fluorometric measurements and more particularly to improvements in cells for containing the sample used in making such measurements. The most accurate methods for assaying materials for content of certain vitamins, notably thiamin and riboflavin, are almost prohibitively tedious and time-consuming, and methods have therefore been devised utilizing the principal of fluorescence. In accordance with such prior methods, ultra-violet light is projected into a sample of the substance undergoing examination, and the light, causing fluorescence in the sample, is then measured and the degree of fluorescence determined. The degree of fluorescence is indicative of the content of riboflavin and certain other factors of the sample, and, therefore, by comparing the fluorescence reading with that of standardized samples, it is possible in a very short time to determine the approximate thiamin and riboflavin contents of various materials.

It is an object of the present invention to improve the apparatus heretofore available for such fluorometric measurements and to provide apparatus in which the degree of fluorescence and photoelectric response of such fluorescence is greatly increased as compared with that obtained by prior apparatus.

It is a further object of the invention to provide an improved container for samples used in making fluorometric measurements and more particularly to provide a cuvette or sample container which is provided with a reflective interior coating throughout the entire exterior area of the sample container save only for the portions through which excitation light is projected into the container and through which the fluorescent response is observed photoelectrically.

Other and further objects of the invention are those inherent in the apparatus herein illustrated, described and claimed.

The invention is illustrated with reference to the drawings in which

Throughout the drawings corresponding numerals refer to the same parts.

Figure 1:
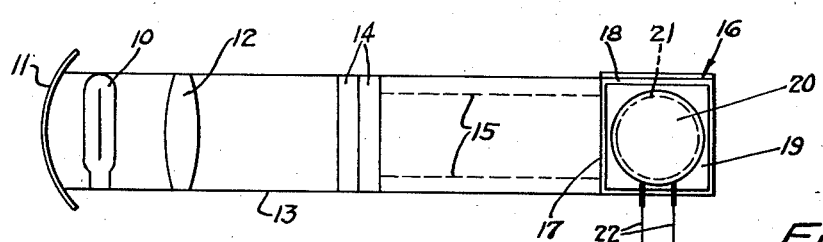
Figure 1 is a schematic side elevational view of the apparatus.

Referring to the drawings, Figure 1, there is shown a light source 10 provided with a reflector 11 for concentrating the light of the light source upon a lens 12, the light source, mirror and lens being supported by the tube 13 which also serves to support one or more filters, when used. The light beam, which is determined by the filter, is shown at 15 and is directed against one face 17 of a fluorometric measurement cell generally designated 16.

The face 17 of the fluorometric measurement cell, sometimes called a "cuvette" is provided with a window 26 and the face 18 of the cell is provided with a window 21. The exterior surface of the cell 16 is otherwise completely coated with a mirror coating shown stippled in the drawings. The coating serves to provide a reflective surface which is reflective toward the interior of the cell 16 throughout the entire cell wall area except for the window 26 and the window 21.

The photocell 20 is positioned so as to view the sample through the window 21 and where desired a filter 19 may be positioned between the photocell and the face 18 of the fluorometric cell. The photocell 20 is connected by lead wires 22 to a suitable measuring instrument 23 of known design.

Figure 2:
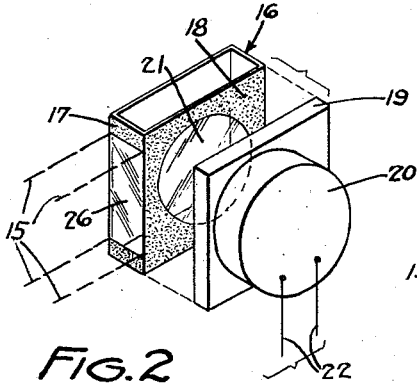
Figure 2 is an isometric view showing certain of the parts separated for better understanding.
Figure 3:
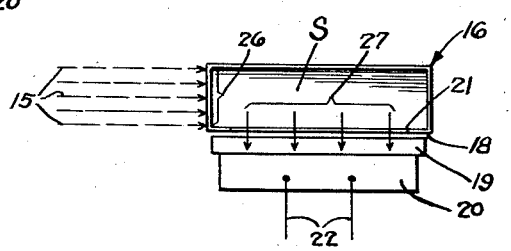
Figure 3 is a plan view of the fluorometric measurement cell, filter and photocell portion of the apparatus of Figure 1.
Figure 4:
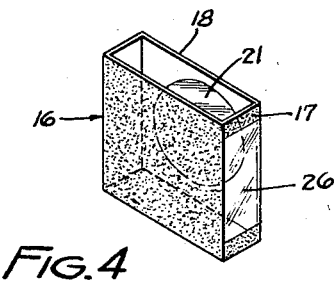
Figure 4 is another isometric view of the sample container only of the apparatus of Figures 1, 2 and 3.

Referring to Figures 2 and 3, the light beam 15 shines through the window 26 into the interior of the cell. The window 21 is, in accordance with the present invention, positioned so that its axis is at an angle to the axis of the window 26 so that light shining into the cell through window 26 does not shine out of the cell through the window 21. Accordingly, the only light which is visible through the window 21 is that due to the fluoroescence of the material within the cell.

Fluorescence is light radiation, presumably caused by the migration of electrons from one shell to another within the atom of a substance when certain wave lengths of light strike the molecule and hence it is desirable that the photocell pick up the fluorescent light only. Thus, the light beam 15 shining through the window 26 into the sample S in the cell causes fluorescence of the sample and the light beams denoted by arrows 27, Figure 3, which are indicative of the fluorescence, shine out against the photocell 20 and produce a photoelectric response thereon. Where used the filter 19 is positioned between the photocell 20 and the window 21 in the face 18 of the fluorometric cell 16.

Figure 5:
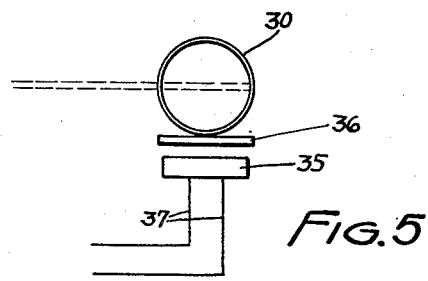
Figure 5 is a plan view of a modified form of the invention utilizing a circular or cylindrical fluorometric measurement cell or cuvette.
Figures 6, 7:
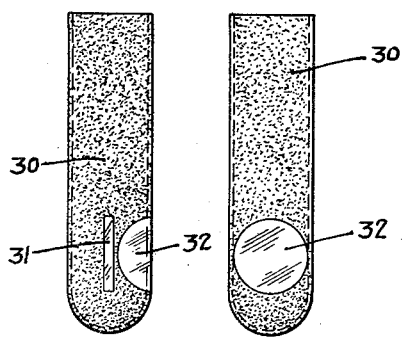
Figures 6 and 7 are side and front elevational views, respectively, of the fluorometric measurement cell or cuvette of Figure 5.

In accordance with the present invention the fluorometric cell may also be of tubular design, thus in the shape of a test tube as illustrated in Figures 5, 6 and 7. In this form of the invention the entire exterior surface of the tube 30 is covered with a mirror coating and through the mirror coating there is provided at least one window 31 through which an excitation light beam may be projected into the sample within the cell, and one or more windows 32 which are positioned at an angle and in relation to window 31 such that light entering the cell through the window 31 does not directly shine out through the window 32. In this modified form of the invention, as in respect to that previously described, there is provided a photocell 35, Figure 5, which is connected by leads 37 to a suitable indicating apparatus. Where desired a filter 36 may be provided between the photocell 35 and the fluorometric cell 30.

In accordance with the present invention it is possible to obtain photoelectric response which is about 300% or more as compared with that obtained when the sample is contained in a clear glass cuvette of identical shape and size. Thus, by providing a mirrored surface on the outside of the cuvette in which the sample is contained and by providing an aperture through the mirror coating for projecting a light beam into the interior of the cuvette and another appropriately placed for viewing the interior of the cell for making the photoelectric measurement therethrough, it is possible to obtain a very much greater photoelectric response than ever before possible. This is of especial advantage since it has been proven that small sample sizes give higher values in assaying most substances for vitamins, particularly thiamin and riboflavin, and therefore by utilizing the present apparatus, the sample size with which the analyst can work accurately is reduced to approximately one-third of the size previously used.

As many apparently widely different embodiments of this invention may be made without departing from the spirit and scope thereof, it is to be understood that I do not limit myself to the specific embodiments herein, except as defined by the appended claims.

What I claim is:

1. An improved fluorometric cell comprising a light transparent container having spaced oppositely disposed walls of transparent material, a mirror coating on the exterior of said walls, one light window through said coating for allowing a light beam to be directed into the cell and a viewing window through said coating out of alignment with the first window through which photoelectric measurements can be taken of the light conditions within the cell.

2. The improved fluorometric cell of claim 1 further characterized in that the cell is shaped like a test tube, and the windows through the mirror coating thereon are positioned so that their axes are at an angle to each other.

3. An improved fluorometric device comprising a fluid tight cell of rectangular cross-sectional shape having sides and a bottom, the cell walls being of light transparent material having a mirror coating on the outside so as to present a highly reflective mirror surface toward the interior of the cell, a light transmitting window through one of the container walls so as to permit light to be directed into the interior of the cell and another window through another cell wall and out of alignment with the first window so as to allow fluorometric measurements to be taken of the light conditions within the cell.

4. The improved fluorometric cell of claim 3 further characterized in that the cell is composed of glass walls mirrored on the outside.

HOWARD LEE CONDIFF.

REFERENCES CITED

The following references are of record in the file of this patent:

UNITED STATES PATENTS

| Number | Name | Date |
|---|---|---|
| 1,412,955 | Nelsen | Apr. 18, 1922 |
| 1,755,834 | Marr et al. | Apr. 22, 1930 |
| 1,807,659 | Grant | June 2, 1931 |
| 2,280,993 | Barnes | Apr. 28, 1942 |
| 2,344,042 | Kallmann et al. | Mar. 14, 1944 |
| 2,381,414 | Wilkie | Aug. 7, 1945 |
| 2,403,631 | Brown | July 9, 1946 |
| 2,451,979 | Rosenblum | Oct. 19, 1948 |

FOREIGN PATENTS

| Number | Country | Date |
|---|---|---|
| 783,957 | France | Apr. 15, 1935 |
| 675,911 | Germany | May 20, 1939 |